June 11, 1968        H. E. ADAMS        3,387,491

COMPASS-ORIENTED FLUID VELOCITY AND DIRECTION SENSOR

Filed March 4, 1966

INVENTOR.
HARRY E. ADAMS
BY
Robert T. Dunn
ATTORNEY

United States Patent Office 3,387,491
Patented June 11, 1968

3,387,491
COMPASS-ORIENTED FLUID VELOCITY AND DIRECTION SENSOR
Harry E. Adams, 106 Gay St., Needham, Mass. 02192
Filed Mar. 4, 1966, Ser. No. 531,717
8 Claims. (Cl. 73—189)

ABSTRACT OF THE DISCLOSURE

A wind velocity and direction device in which signal impulses are generated, the frequency of which is proportional to wind speed and pulses are generated as a result of interaction between a wind direction sensing means and a magnetic compass, these pulses being indicative of the magnetic direction of the wind. The output is thus independent of the orientation of the device and it may be used on a moving vehicle.

---

This invention relates to fluid flow or wind sensors and more particularly to a wind velocity and direction sensor for producing wind direction signals related to magnetic north.

Heretofore, wind velocity and direction at a remote location has been sensed by an anemometer and a wind vane mounted on separate independently rotating shafts. The shafts drive parts of associated electro-mcehanical apparatus so that the apparatus produces electrical signals which are indicative of wind velocity and wind direction relative to the directional orientation of the equipment. A device of this type is described in my co-pending application Serial No. 501,319 entitled "Flow Sensor." The system described in the application produces electrical pulses at a rate indicative of wind velocity and also produces electrical signals which define a direction count interval such that during the direction count interval, a count of the pulses produces a number representative of the direction of the wind relative to the directional orientation of the device in the wind.

For most applications, it is desired to determine wind direction relative to magnetic north or relative to a particular magnetic compass direction. The apparatus in my co-pending application will provide information for determining this if the orientation of the apparatus relative to magnetic north is known. The usual technique is to determine north by means of a compass and then to orient the wind sensor so that fixed index marks on the sensor are aligned with a north-south line. The sensor will then generate direction with respect to north. This technique is used in applications where the sensor can be permanently secured after alignment.

For applications where the sensor is located on a moving vehicle, it is necessary to continuously (and probably automatically) change the orientation between the sensor and the vehicle in order to keep the sensor aligned with a north-south line. Since this is an inconvenient thing to do, a preferred approach is to determine the orientation of the sensor relative to north, using for example, a separate compass, and then to make a correction to the direction obtained from the sensor.

In some applications such as, for example, on ocean buoys where the signals must be recorded or sent to a land-based computer, it is inconvenient to use the above technique, because of the additional mechanism required, the additional electric power required, and the additional recording or telemetering channel required. Accordingly, it is an object of the present invention to provide a wind sensor which directly produces direction relative to magnetic north when mounted on a moving vehicle.

It is another object of the present invention to provide a wind sensor which produces electrical signals indicative of wind velocity and wind direction relative to magnetic compass directions such as, for example, magnetic north.

It is another object of the present invention to provide a wind sensor in which all mechanical motion is derived from the wind itself and which produces electrical signals indicative of wind velocity and wind direction relative to magnetic compass directions.

It is another object of the present invention to provide a wind sensor including an anemometer and a wind direction vane which connect with cooperating parts to produce electrical signals representing both wind velocity and wind direction relative to magnetic compass directions.

It is another object of the present invention to provide a wind sensor including an anemometer and wind direction vane for driving parts which cooperate in such a manner as to produce digital signals representing wind velocity and wind direction relative to magnetic compass directions.

It is another object of the present invention to provide a wind sensor for location at a remote or mobile station for generating and transmitting to a receiver location sets of electrical pulses which may be counted at the receiver location to determine wind velocity and direction relative to magnetic compass directions at the remote location.

In accordance with principle features of the present invention, anemometer cups and a wind vane are mounted on separate independently rotating shafts. The wind velocity shaft positions a circular body having angular markings or indices thereon, while the direction shaft positions a moveable detector or pick-up which cooperates with the indices to produce an electrical stop signal pulse each time the pick-up comes in coincidence with one of the indices. Other fixed pick-ups produce pulses as the indices come into coincidence therewith. The velocity shaft also positions a moveable pick-up which cooperates with the north-aligning parts of a magnetic compass to produce an electrical start signal pulse each time this pick-up comes in coincidence with the north-aligning parts of the compass. A count of the pulses produced by one of the fixed pick-ups represents wind velocity and a count of the same pulses during the interval between said start and stop signals represents wind direction relative to a pre-selected magnetic compass direction such as north.

The above mentioned counts of pulses are preferably performed at a control or receiver location to which the pulses and signals from the wind sensor are transmitted. Accordingly, it is convenient to transmit the pulses and signals along separate channels from the remote location to the receiver location. The wind sensor mechanism need only be energized sufficiently to produce the pulses and signals which are generated when the detectors or pick-ups come into coincidence as described. No additional power need be applied to the wind sensor or the compass, because the wind itself provides the necessary mechanical power to drive the various parts and the earth's magnetic field positions the moving parts of the magnetic compass.

Other features and objects of the present invention will be apparent from the following specific description taken in conjunction with the figures in which.

Figure 1:
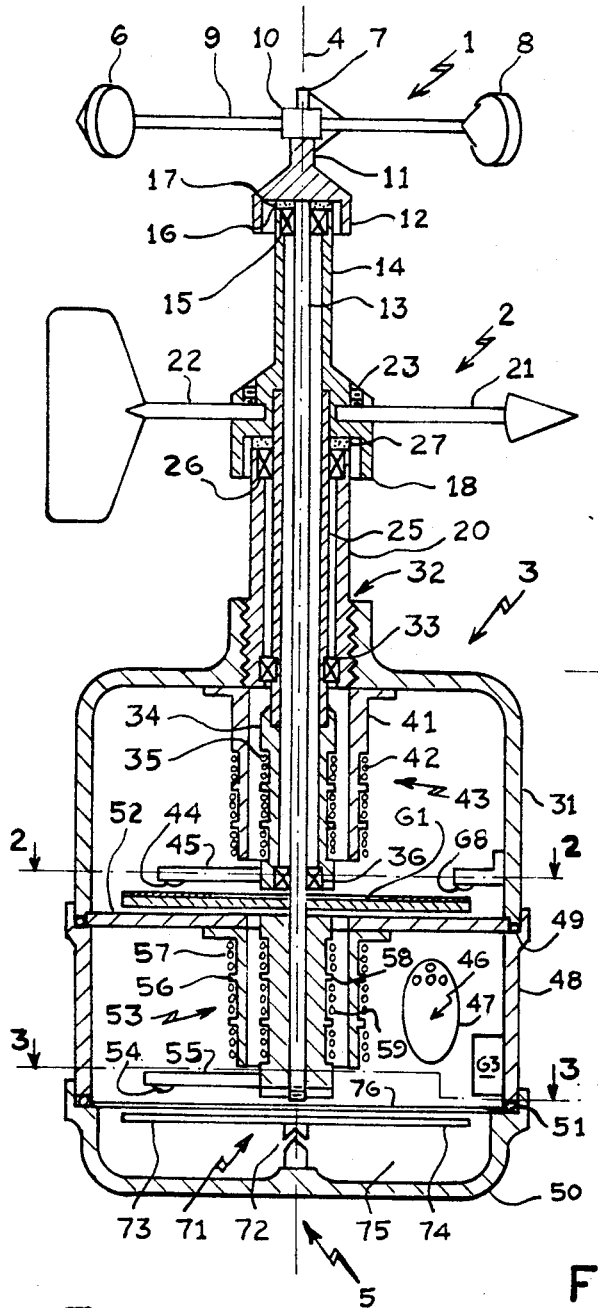
FIGURE 1 is a sectional view illustrating the anemometer cups, wind direction vane and shafts which connect to electro-mechanical apparatus for generating the pulses and signals which represent wind velocity and direction relative to magnetic north.

FIGURE 1 illustrates details of the anemometer cups 1, wind vane 2 and concentric speed and direction shafts which connect to electro-mechanical apparatus within the housing 3. The apparatus is mechanically positioned by the shafts so that signals are produced which represent wind velocity and direction relative to magnetic north. Most of the parts illustrated are figures of revolution about the axis 4 of the device. It will be apparent from the following detailed description which parts are not figures of revolution.

The complete wind sensor includes anemometer cups 1, wind direction vane 2 and a housing 3 for mechanical and electrical parts and containing a magnetic compass 5, which cooperates therewith to produce the electrical pulses and signals which are transmitted from the sensor to a receiver location. At the receiver location, wind velocity and direction relative to magnetic north are computed from the pulses and signals. The wind sensor, as shown in FIGURE 1, is a compact sealed unit capable of enduring the most extrement weather conditions and operating entirely without mechanical power applied thereto except via the wind.

The anemometer cups 6, 7 and 8 each mounted on a rod such as 9 are supported by the cup holder 10 so that the rods 9 extend therefrom in equally spaced angular directions. The holder is attached to the holder shaft 11 which extends to the cup holder skirt 12 and is concentric with both the speed shaft 13 and the vane holder shaft 14. The speed shaft 13 is fixed to the holder shaft 11, and thus, to the anemometer cups 1 by, for example, a set screw in the holder shaft which engages the speed shaft. The vane holder shaft 14 which is concentric with the speed shaft is spaced from the speed shaft and rotatably attached thereto via ball bearing 15. A spacer 16 and truarc ring 17, or its equivalent, are disposed at the end of the speed shaft 13 to hold the shaft and therefore cup holder skirt 12 in position with respect to the bearing 15. Thus, the anemometer cups are free to rotate the speed shaft 13 independent of rotation of the vane holder shaft 14.

The vane holder shaft extends to the vane holder skirt 18 which encloses one end of the shaft housing 20. Extending from the vane holder shaft just above the skirt are the vane arms 21 and 22 which attach to the vane head and vane tail, respectively. These arms are secured to the vane holder shaft by set screws, such as set screw 23, which engage the arms.

Concentric with the vane holder shaft and fixedly attached thereto is the direction shaft 25. The shaft housing 20 extends within the skirt 18 and is suitable spaced therefrom and is also spaced from the direction shaft 25 and rotatably connected to the direction shaft 25 by a ball bearing 26 so that the wind direction vane 2, vane holder shaft 14, skirts 18 and direction shaft 25 are free to rotate relative to the fixed shaft housing 20. A spacer 27 is disposed between the end of the shaft housing 20 and the top inside of the skirt 18 to insure suitable clearance therebetween, permitting free rotation of the skirt about the housing. Thus, extending below the wind direction vane 2 are three concentric shafts on the axis 4. The first is the shaft housing 20 which is fixed and within that are the direction shaft 25 and speed shaft 13, both free to rotate relative to each other and relative to the housing.

The lower portion of the wind sensor includes the housing 3 and the magnetic compass 5. FIGURE 1 illustrates the mechanical and electrical parts contained therein for producing the pulses representing wind velocity and direction. Most of the parts shown in this figure are figures of revolution about the axis 4. The shaft housing 20 attaches to the upper transformer housing 31 by, for example, threading thereto in an opening 32 at the top of the housing. The lower end of the direction shaft 25 rotatably engages the lower end of the shaft housing 20 via a ball bearing 33 and, thus, the direction shaft is supported at two points via ball bearings 33 and 26 by the shaft housing 20. From this point of support, the direction shaft 25 extends as the rotary transformer rotor core 34 which carries on the outside thereof the rotor windings 35. A fourth bearing 36 at the end of the core 34 rotatably engages the speed shaft 13 and, thus, the speed shaft is supported at two points relative to the direction shaft via the bearings 15 and 36 and both the speed and direction shafts are carried by the shaft housing 20 which is fixed to the upper transformer housing 31.

The rotary transformer stator base cylinder 41, attached rigidly to the housing 31, encircles the core 34 and windings 35 and carries on the outside thereof the stator windings 42. The stator windings 42, rotor windings 35 and core 34 combine to form the upper rotary transformer unit 43 which couples the electrical signals from a moveable ferrite core pick-up 44, referred to as the stop pick-up, to a pair of the conductors 46 in electrical transmission line cable 47 which is fixed to the lower transformer housing 48 and carried therefrom via an electrical plug which is not shown. The stop pick-up 44 is carried by the stop support arm 45 attached to the core 34, so that it rotates with the direction shaft.

The lower part of the housing assembly 3 includes the lower transformer housing 48, which attaches to the bottom of the upper housing member 31, and is sealed thereto via O-ring 49. The attachment here may be a forced fit or clamps may be imposed to insure a tight seal between the upper and lower housing members. The compass housing 50 attaches to the bottom of the lower housing and seals thereto via an O-ring 51 so as to form a tight seal therebetween.

A support disk 52 is mounted between the upper and lower housing members and carries the stator parts of the lower rotary transformer unit 53. This unit serves to couple electrical signal from a moveable ferrite core pick-up 54, referred to as the start pick-up, which is carried by the start support arm 55, attached to and supported by the speed shaft, so that the arm rotates with the speed shaft. The transformer unit 53 serves to energize the primary winding of start pick-up 54 and couples pulses from the secondary thereof to the transmission line 47 fixed to the housing. For this purpose, the lower rotary transformer 53 includes stator base cylinder 56 which is attached to the support disk 52 and carries the stator windings 57 which connect to the transmission line cable 47 fixed to the housing. The lower rotary transformer rotor core 58 is fixed directly to the speed shaft 13 and carries the rotor windings 59 which inductively couple with the stator windings 57 so that electrical energy for energizing the primary of the start pick-up 54 and the pulses produced in the secondary of the start pick-up are coupled to leads in transmission line cable 47.

The speed disk 61 is attached to the speed shaft 13 and fixed thereto just below the stop pick-up 44. The outer periphery of the speed disk 61 consists of a ring 62 of ferrite material, or magnetically permeable material such as barium ferrite, upon which are imposed by magnetizing, discrete spots wherein the ferrite material is magnetized and, as will be seen later, two sets of such spots are spaced about the ring 62. Magnetic transformer devices such as ferrite core pick-ups are disposed just above the sets of spots so that as the spots pass the cores, electrical signals are produced in the core windings. These core pick-ups are carried by structure fixed to the housing 31.

None of the core pick-ups nor any of the wiring connected thereto is shown in FIGURE 1, but all the core output windings connect to leads in the transmission line cable 47 and all are energized by an input line carried by the cable and which connects to the *a* line transformer 63.

Figure 4:
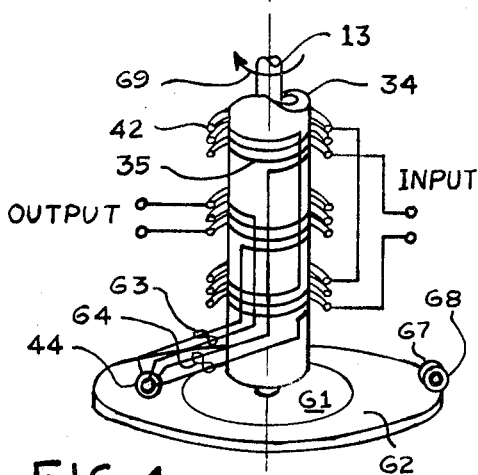
FIGURE 4 is a pictorial representation of one of the rotary transformers for carrying a start or stop signal from a moveable pick-up to a signal transmission line fixed to the apparatus housing.
Figure 2:
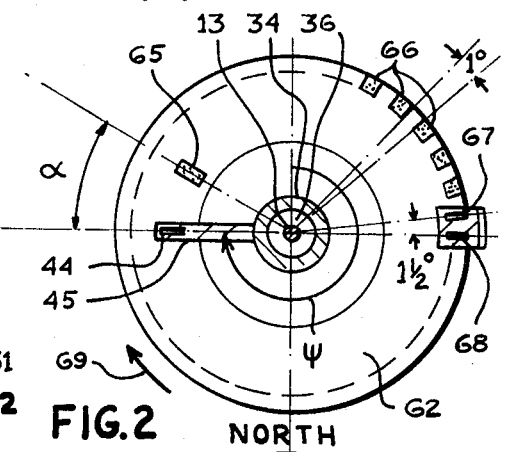
FIGURE 2 is a plan view of the speed disk attached to the speed shaft to show the indices thereon and the relative positions of pick-ups which cooperate with these indices to produce the pulses and the direction count interval stop signal.
Figure 3:
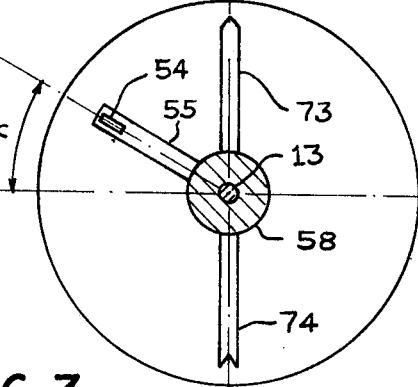
FIGURE 3 is a plan view illustrating the magnetic compass pointer and the pick-up which cooperates therewith to produce the direction count interval start signal.

FIGURES 2, 3 and 4 illustrate the electrical and mechanical cooperation between parts within the housing constructed and operated in accordance with the invention. As shown, the moveable stop pick-up core 44, which is carried by the support 45 rotated by the rotor core 34, has its primary and secondary windings 63 and 64, respectively, connected as shown to the rotor windings 35 carried by the rotor core 34 fixed to the speed shaft 13. As already described, alternating electrical energy is carried to and from these rotor windings via the rotary transformer stator windings 42. The pick-up 44 is positioned close to the ferrite disk 62 and couples magnetically to the magnetized stop spot 65 on the ferrite disk. A second set of magnetized spots on the ferrite disk, denoted the degree spots 66, disposed on a different radius than the stop spot and spaced one degree apart, magnetically couple with the pair of fixed degree pick-ups 67 and 68 which are spaced one and a half degrees apart and carried by the housing 31. Thus, the three core pick-ups 44, 67 and 68 all couple magnetically with spots on the disk 61 attached to the speed shaft 13.

In operation, the wind rotates the speed shaft 13 in the direction of arrow 69 and positions the direction shaft 25. Since the transformer pick-up 67 is positioned one and a half degrees from transformer pick-up 68, a pulse will be produced by transformer 67 one half a degree of rotation of the disk 62 before each degree pulse produced by the pick-up 68. The purpose of the pulse from pick-up 67 is to clear the binary circuit triggered by pulses from pick-up 68 before each of the pulses from pick-up 68 arrives at the circuit. Thus, pick-up 67 could be dispensed with without eliminating any of the fundamental features of operation. The two pick-ups are preferred to prevent multiple pulses, which might be generated by pick-up 68 due to noise or irregular mechanical motion of the sensor, and which would cause an incorrect direction count.

The degree pulses from pick-up 68 are counted during a fixed calibrated interval and represents wind velocity. Meanwhile these same degree pulses from pick-up 68 are also counted during the direction count interval, which commences with a pulse from start pick-up 54 and terminates with a pulse from stop pick-up 44.

The direction count interval, combined with the degree pulses, indicates the angular position of the stop pick-up 44 relative to needle 71 of the compass 5. Since pick-up 44 is fixedly connected to the direction vane 2, this angular position represents the wind direction relative to the compass needle. Thus, a count of the number of degree pulses from transformer 68 during this direction count interval indicates the direction of the vane relative to magnetic north.

This operation is demonstrated by the plan views of the speed disk 61 and the magnetic compass shown in FIGURES 2 and 3. Let magnetic north be as indicated in FIGURE 3. Thus, the magnetic needle 71 of the compass, which is the moveable part of the compass, will align, by rotating on a bearing 72, with the north-south direction. The compass needle preferably consists of an entirely magnetized portion 73 and a non-magnetic portion 74 located at the other end, serving as a balance for the magnetized portion. The start pick-up 54 passes across both the magnetic portion 73 of the needle and the non-magnetic portion 74 of the needle. A pulse signal is produced in pick-up 54 when it passes the magnetized end 73. This pulse is the start signal.

The compass needle 71 is immersed in a damping fluid 75 for stability and which is sealed within the campass housing 50 by a thin cover 76 of non-magnetically permeable material so as to permit the start pick-up 54 to magnetically couple to the magnetic part 73 of the compass needle 71. Thus, each time the start pick-up 54, which is fixedly attached to the speed shaft 13, comes into registry with the magnetic part 73 of the compass needle, a start pulse is produced initiating the beginning of the direction count interval.

The stop spot 65 on the speed disk 61 is fixed to the speed shaft 13 just as is the start pick-up 54 and, preferably at the same angular position relative to the shaft. This spot rotates in the direction of arrow 69 and produces a stop pulse in pick-up 44 upon coming into coincidence therewith. Thus, the speed disk 61 will rotate through an angle $\psi$ following a start pulse from the start pick-up 54 before a stop pulse is produced by the stop pick-up 44 and this angle $\psi$ is the angular position of the stop pick-up relative to magnetic north. A count of the degree pulses from the fixed pick-up 68 during the interval is a direct indication of the angle $\psi$.

The direction vane 2 is preferably positioned on the direction shaft at the same angular position as the stop pick-up 44 so that the angle $\psi$ is the same as the wind direction relative to north. Thus, a count of the degree pulses during the direction count interval is the angle $\psi$ (azimuth), in degrees, of the wind relative to magnetic north.

Suitable computer and counting equipment located at a control location to which the pulses are transmitted serves to accomplish the direction count and velocity count and presents indications of wind velocity and direction.

In applications in which the vehicle on which the sensor is mounted does not remain level, such as for instance an ocean buoy, the entire apparatus is mounted on gimbals. Such a gimbal mount is not shown herein because they are well known in the art. Gimballing the sensor serves two useful purposes. First, it keeps the compass needle 71 parallel to the plane of rotation of pick-up 54 so that the magnetic coupling does not change. Secondly, it keeps the axis of rotation 4 of the sensor perpendicular to the earth's surface so that the wind speed and direction measured are the true horizontal component of the total wind field.

This completes a description of the present invention of a fluid velocity and direction sensor which produces electrical signals consisting of pulses which can be counted to yield a number representative of the fluid velocity and direction relative to magnetic north through the cooperation of parts in the sensor which are driven in rotation and positioned by the flowing fluid. The rotating parts of the device include judiciously located indices which cooperate with fixed and moveable pick-ups, which in turn cooperate with the moving parts of a magnetic compass to produce the pulses and signals. The specific embodiment described herein, however, is made by way of example and is not intended to limit the spirit and scope of the invention as set forth in the accompanying claims in which:

I claim:

1. In a device for detecting the direction and velocity of flow of a fluid which includes a housing supporting,
   velocity sensing means coupled to said fluid and driven at a speed proportional to said velocity of flow,
   direction sensing means coupled to said fluid and positioned in a direction related to said direction of flow and,
   means driven by said velocity and direction sensing means for producing pulse signals at a rate representative of said velocity,
   means for producing a count of said pulses which represents said flow direction relative to magnetic north comprising,
   means driven by said velocity and direction sensing means for producing a first interval defining signal,
   magnetic compass means stationary with respect to said housing,
   means driven by said velocity sensing means and the north orienting part of said magnetic compass for producing a second interval defining signal and means for counting said pulse signals during the interval defined by said first and second interval defining signals to produce said count representing direction.

2. A device as in claim 1 and in which, said means for producing pulse signals includes some fixed parts which cooperate with moveable parts driven by said velocity sensing means to produce degree pulse signals and said first interval signal indicative of one end of said count interval and at least some of said moveable parts driven by said velocity sensing means and said north orienting parts of said compass cooperate to produce said second interval signal indicative of the other end of said count interval, and said degree pulses are counted over said interval to produce a number indicative of said flow direction relative to the position of said north orienting compass part.

3. A device for detecting the direction and velocity of flow of a fluid comprising a housing, means supported by said housing which couples to said fluid and is driven in rotation at a speed related to the velocity of said fluid, means supported by said housing which couples to said fluid and is positioned in a direction related to the direction of flow of said fluid, a circular body driven in rotation by said first mentioned means, movable detecting means positioned by said second mentioned means, detecting means fixed to said housing, indices on said circular body with which said moveable and fixed detecting means cooperate to produce degree pulses and a signal pulse indicating one end of a direction count interval, another moveable detecting means positioned by said first mentioned means and a magnetic compass, supported by said housing, the magnetized parts of which cooperate with said other moveable detecting means so that said other detecting means produces a signal pulse indicating the other end of said count interval, means for counting said degree pulses over any predetermined interval of time to produce a number representative of said velocity and means for counting said degree pulses during said count interval to produce a number indicative of said flow direction relative to a preselected magnetic compass direction.

4. A device as in claim 3 and in which, said indices on said circular body includes a set which cooperates with said fixed detectors to produce said count pulses and an additional indice which cooperates with said first moveable detector to produce said signal indicating one end of said direction count interval.

5. A device as in claim 3 and in which, said circular body carries a surface of magnetically permeable material, said set of indices and said additional indice are magnetized spots on said surface and said detecting means include transformers which inductively couple with said magnetized spots and a transformer which inductively couples with the magnetized part of said magnetic compass.

6. A device as in claim 3 and in which, said circular body carries a surface of magnetically permeable material, said set of indices and said additional indice constitute magnetized spots on said surface and said detecting means include ferrite core transformers which inductively couple with said magnetized spots and a ferrite core transformer which inductively couples with the magnetized part of said magnetic compass.

7. A device as in claim 6 and in which, said transformers are energized from a source of carrier frequency located remote from the device, and said transformers produce pulses in said carrier frequency in response to magnetic coupling variations between said transformers and said magnetized spots or said magnetized part of said compass.

8. A device as in claim 3 and in which, said moveable detecting means which cooperates with indices on said circular body produces a pulse indicating the beginning of said direction count interval.

References Cited

UNITED STATES PATENTS

| | | | |
|---|---|---|---|
| 2,375,227 | 5/1945 | Hillman | 73—189 |
| 3,282,099 | 11/1966 | Kingman | 73—189 |
| 3,068,692 | 12/1962 | Morgan | 73—189 |

JAMES J. GILL, *Primary Examiner.*

RICHARD C. QUEISSER, *Examiner.*

JERRY W. MYRACLE, *Assistant Examiner.*